United States Patent [19]
Cleary, Jr.

[11] 3,800,125
[45] Mar. 26, 1974

[54] OMNI-CONVERTER WITH DIGITAL PHASE SHIFTER
[75] Inventor: Edward J. Cleary, Jr., Seattle, Wash.
[73] Assignee: The United States of America as represented by the Secretary of the Navy, Washington, D.C.
[22] Filed: Oct. 24, 1972
[21] Appl. No.: 300,029

[52] U.S. Cl........ 235/150.2, 235/92 R, 235/150.27, 343/106, 343/107
[51] Int. Cl. ............................ G01s 1/26, G06f 15/50
[58] Field of Search..... 235/150.23, 150.25, 150.27, 235/150.2, 92 CA, 92 TC, 92 FQ, 92 PS, 92 CC; 343/105, 106, 107, 112, 6.5, 6; 324/83

[56] References Cited
UNITED STATES PATENTS

| 3,386,096 | 5/1968 | Lundgreen et al. | 343/106 |
| 3,262,117 | 7/1966 | Stover | 343/106 D |
| 3,478,360 | 11/1969 | Hirsch | 343/106 |
| 3,454,948 | 7/1969 | Reinagel | 324/83 D |
| 3,349,400 | 10/1967 | Asher et al. | 343/106 |
| 3,349,401 | 10/1967 | Kennedy et al. | 343/106 |
| 3,474,449 | 10/1969 | Briggs | 343/106 |
| 3,223,830 | 12/1965 | Evans | 235/92 CA |
| 3,659,291 | 4/1972 | Anthony | 343/106 |
| 3,375,522 | 3/1968 | Kennedy | 343/106 |

Primary Examiner—Malcolm A. Morrison
Assistant Examiner—Errol A. Krass
Attorney, Agent, or Firm—R. S. Sciascia; Roy Miller

[57] ABSTRACT

A VHF omnidirectional range converter wherein digital logic replaces the analog circuitry heretofore used in the phase shifter and related portions of the converter.

9 Claims, 9 Drawing Figures

Fig. 3

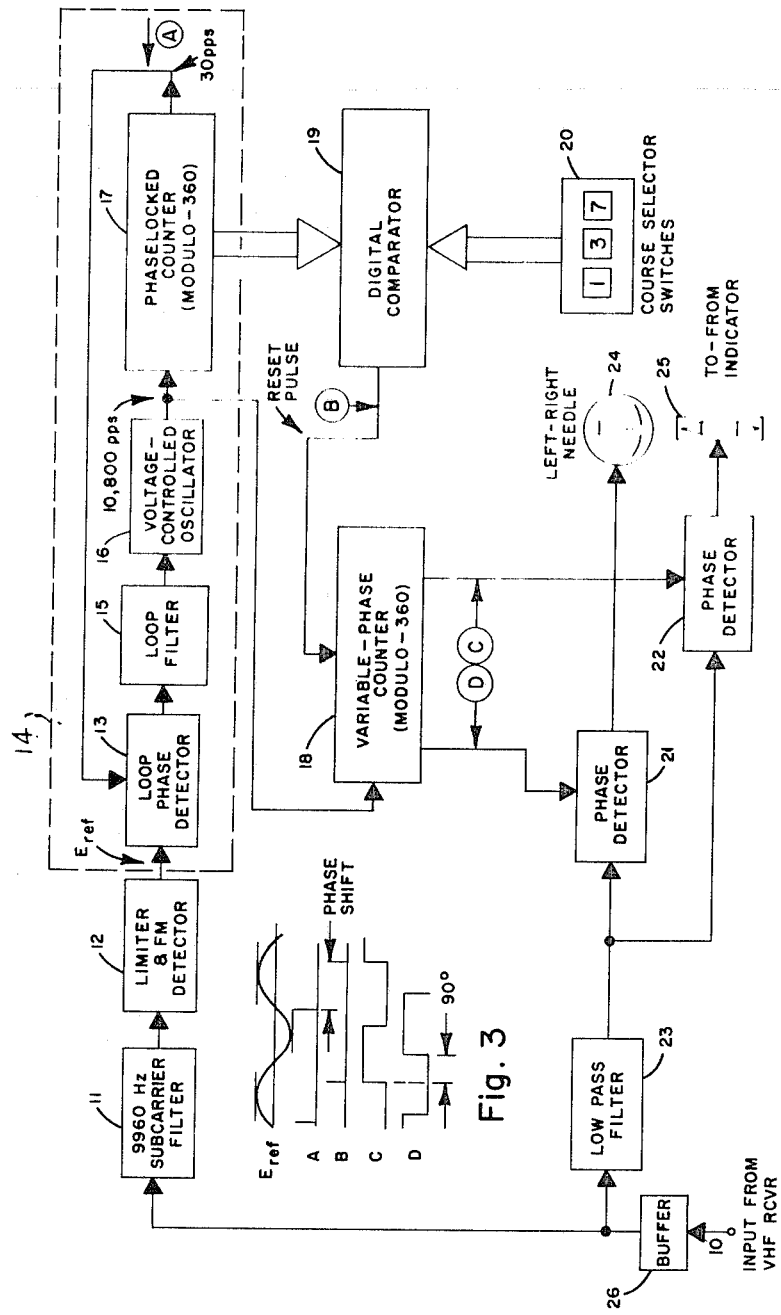

OMNI-CONVERTER WITH DIGITAL PHASE SHIFTER

BACKGROUND OF THE INVENTION

1. Field of the Invention

The VHF omnidirectional range, commonly called VOR, or omni, was introduced in 1945 and has become the primary enroute aid to air navigation in the United States. The term "omnidirectional range" refers to a system in which the pilot can select any compass course, or "radial" from the station and get an indication of a deviation from that course. The VOR supplies only bearing information for course guidance. Position determination requires either two VOR stations for triangulation or DME (distance measuring equipment), a UHF navigational aid located at many VOR sites.

The VOR, operating in the 108-to-118 MHz band, produces two 30-Hz signals; a reference signal and a bearing signal. The phase of the reference signal is the same everywhere in space while the phase of the bearing signal depends on the plane's magnetic bearing from the station at any given time. The difference between the reference and bearing signals is numerically equal to the magnetic bearing from a particular station.

The reference phase is transmitted as a 30 Hz frequency modulation on a 9960 Hz subcarrier with a deviation of ± 480 Hz. The bearing phase appears at the receiver as a 30 Hz amplitude modulation of the main carrier. The modulation is generated in space by rotating a cardioid-shaped radiation pattern at 30 revolutions per second.

In normal operation, the pilot sets the desired bearing on his course selector and flies the airplane to center a left-right needle.

VOR differs from the familiar ADF (Automatic Direction Finder) in that it gives the same indication regardless of the airplane's heading. ADF gives direction to the station relative to the direction the nose of an aircraft is pointed.

2. Description of the Prior Art

The VOR signal converter must demodulate the subcarrier to recover the reference phase, shifted by any selected amount (corresponding to the desired course) and compared to the phase of the bearing signal. A phase error corresponds to course error and is read out on a left-right needle. Phase detectors normally have two nulls 180° apart. One of these corresponds to the bearing from the station and the other the bearing to the station. A second indicator, the to-from indicator, resolves the ambiguity. It usually takes the form of a small flag or error integrated into the same display as the left-right needle.

This characteristic turns out to be operationally advantageous in the system. First, it is convenient to set the course selector to the compass heading to be flown regardless whether it is toward or away from the station. The selector need not be changed when passing the station when no turn is to be made. Second, reversal of the to-from indicator, while the left-right needle remains centered, provides a convenient indication of station passage.

FIG. 1 is a block diagram of a typical analogue VOR converter. The signal from the VHF receiver is coupled to a pair of filters which split the input into a reference and bearing channel.

In the reference channel, a high pass (or band pass) filter isolates the frequency-modulated 9960 Hz subcarrier. A limiter strips off any residual amplitude modulation and an FM demodulator recovers the 30 Hz reference phase signal, $E_{ref}$. A phase splitter provides two outputs in phase quadrature to drive the two stator windings of an inductive resolver. The phase of the voltage, $E_r$, induced in the rotor winding is proportional to its shaft angle and a suitably calibrated dial attached to the shaft permits selection of the desired course.

The output, $E_r$, of the phase shifter must be phase-compared with the voltage $E_{bearing}$ to determine if the aircraft is on course. $E_{bearing}$ is the 30-Hz amplitude modulation which is separated from the composite VOR signal by a low pass or band pass filter. Since the phase detector output nulls when the inputs are in phase quadrature, the selector dial is calibrated so that the resolver output voltage $E_r$ is in quadrature with the dial reading.

The reference voltage $E_{ref}$ is shifted an additional 90° and compared with the bearing signal to indicate the to-from condition. A "from" indication means the dial reading and $E_{bearing}$ are in phase; "to," means that they are 180° apart.

BRIEF DESCRIPTION OF THE DRAWING

FIG. 2 is a block diagram of the VOR converter using a digital phase shifting technique;

FIG. 3 is a graph of voltages at various points in the block diagram of FIG. 2;

SUMMARY

Figure 1:
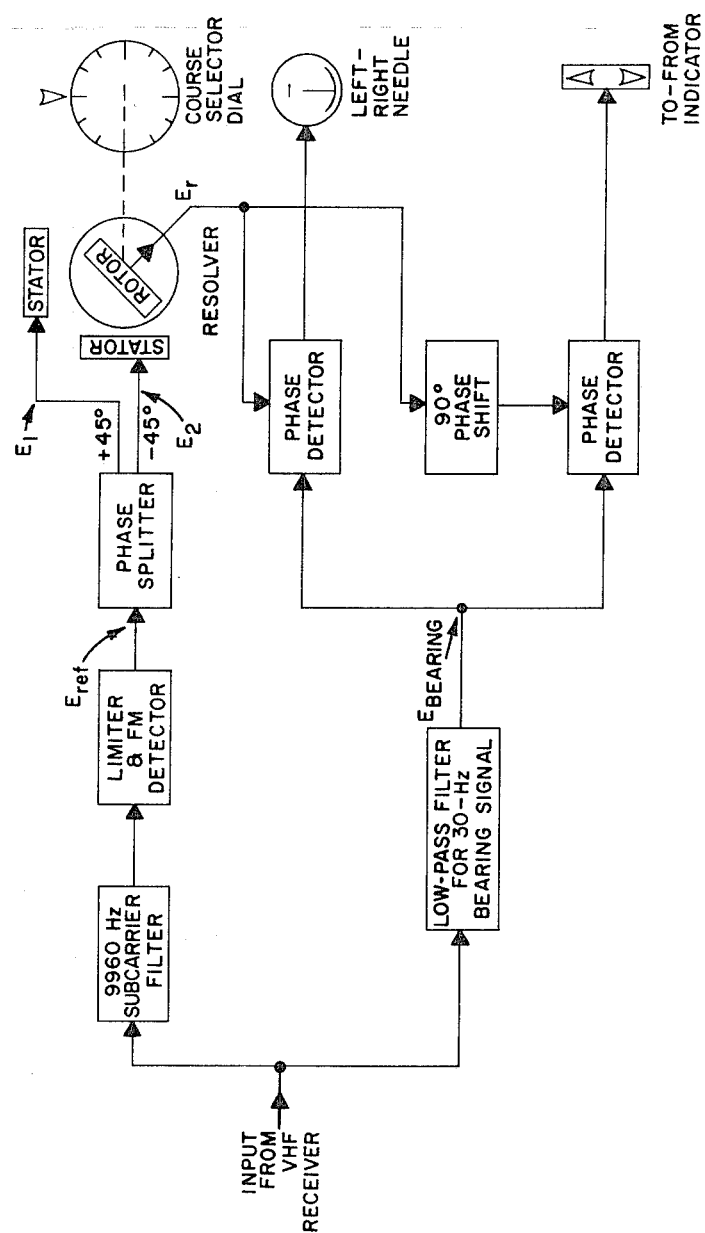
FIG. 1 is an illustration of the prior art.

The present invention comprises a digital implementation of the phase shifter of a VOR converter. The digital technique provides a system which is inherently accurate and not dependent on critical adjustments or parameters. It offers the possibility of reduced size and weight, particularly if large scale integration techniques are applied. In addition, the desired course can be selected digitally and there is no need to interpolate between calibration marks on a dial. Therefore, the setting is more accurate and more readable.

DESCRIPTION OF THE PREFERRED EMBODIMENT

The digital converter is shown in block diagram form in FIG. 2. An input from a VHF receiver is coupled from an input 10 through a buffer 26 to a 9960 Hz subcarrier filter 11 the output of which is coupled to a limiter and FM detector 12. The reference voltage, $E_{ref}$, is then coupled to the input of a phase detector 13 which forms part of a phaselock loop generally indicated at 14. The output of the loop phase detector is coupled through a loop filter 15 to a voltage controlled oscillator, which forms the clock 16, the output of which is coupled to a phaselocked counter 17 and as one input to a variable phase counter 18. The output of the phaselocked counter 17 is coupled as one input to a digital comparator 19 the other input to which comprises the output of course selector switches 20. The output of the digital comparator is also coupled as an input to the variable phase counter 18.

The variable phase counter 18 has two outputs, one of which is coupled to a first phase detector 21 and the other output of which is coupled to a second phase detector 22.

The input from input 10 is also coupled to a low pass filter 23 the output of which is coupled to the inputs of the phase detectors 21 and 22. The output of phase detector 21 is coupled to a left-right indicator 24 while the output of phase detector 22 is coupled to a to-from indicator 25.

FIG. 3 is a graph of waveforms appearing at various places in the converter of FIG. 2.

In the system of FIG. 2, the technique is to run a clock at 360 times the reference-phase frequency so that one clock period corresponds to one degree of phase of the 30 Hz reference. The clock frequency then is 360 times 30 or 10.8 KHz. The clock pulses are generated by the voltage controlled oscillator 16, which are then counted down by the modulo - 360 counter 17. The phaselock loop 14 adjusts the VCO to force the counter's 30 Hz output pulses to coincide with the zero-crossings of the 30 Hz reference, $E_{ref}$.

The binary-coded-decimal (BCD) output from the phaselocked counter 17 is fed to the digital comparator 19. When the counter state corresponds to the output of the bearing selector switches (also binary coded-decimal) the comparator 19 produces an output pulse which resets the variable phase counter 18 to 0. The variable counter 18, clocked by the same output pulse from VCO 16 as the phaselocked counter 17, is thus delayed from the phaselocked counter 17 by the number of VCO pulses that are set on the bearing selector switches 20. Since each pulse corresponds to 1° at 30 Hz, the desired phase shift is accomplished.

The variable phase counter 18 differs from the phaselocked counter 17 in its logic arrangement, as will be shown, so that instead of counting in BCD fashion, it produces two square waves in phase quadrature and their complements. These waveforms are outputted to the phase detectors 21 and 22 to provide an output for the left-right and to-from indicators 24 and 25 respectively.

Figure 4:
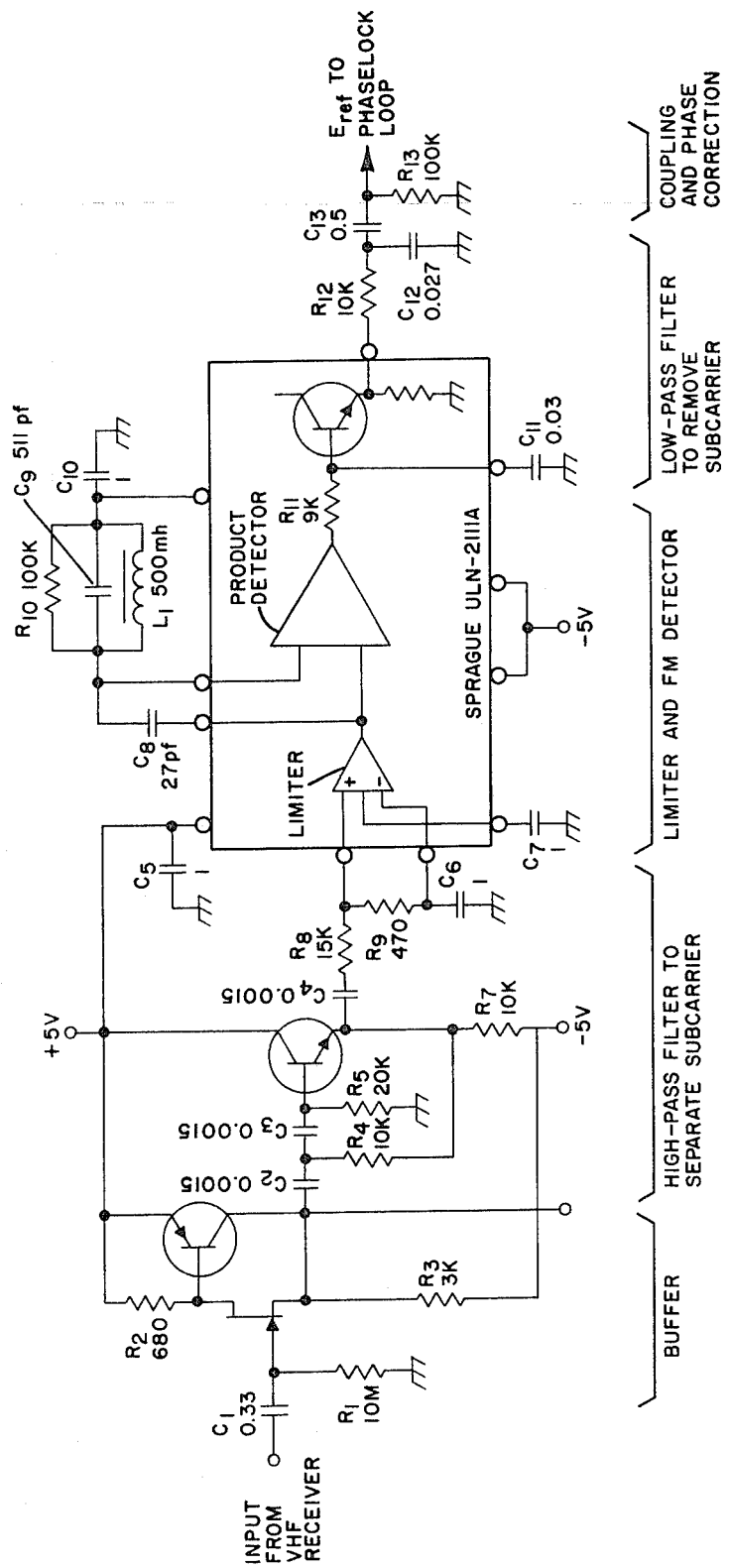
FIG. 4 is a detailed schematic of the reference phase recovery circuit.

FIG. 4 is the detailed schematic of the circuit for obtaining the reference phase voltage ($E_{ref}$) from the frequency modulated subcarrier. All capacitance values are in $\mu f$ and all resistance values in ohms unless otherwise indicated.

The input buffer uses a bootstrapped FET unity-gain amplifier to provide a very high input impedance to the VHF receiver's output. This is done to prevent significant phase shift of the 30-Hz bearing phase due to capacitive coupling in the receiver's output. The buffer also provides a reasonably low-impedance drive for the circuits following it.

The buffer drives a three-pole linear-phase (Bessel) high-pass filter to extract the subcarrier. The linear-phase characteristic was chosen to minimize distortion of the frequency modulation. The two complex poles are provided by a Sallen-and-Key type active filter, using an emitter follower for the unity-gain element, while the real pole is supplied by the R-C coupling network at the output.

A Sprague ULN-2111A integrated circuit provides for the limiting and FM detection. It consists of a three-stage symmetrical limiter, and a balanced product detector. The limiter feeds one of the detector inputs directly and the other through an external phase shift network. A parallel tuned circuit, coupled to the limiter by a small capacitor, provides a phase shift of 90° at the subcarrier frequency; around this frequency the phase shift is an approximately linear function of frequency. The range of linearity is inversely proportional to circuit Q, which is set by choosing a suitable value for $R_{10}$. The product detector translates the phase difference between inputs to an amplitude variation, recovering the modulation. For a full description of the detector circuit, refer to Sprague technical paper No. TP-67-21, "A Monolithic Limiter and Balanced Discriminator for FM and TV Receivers," by A. Bilotti and R. S. Pepper, as presented at the National Electronics Conference, Chicago, Illinois, 1967.

The remaining subcarrier frequency at the output is removed by a two-pole low-pass R-C net, $R_{11}$–$C_{11}$ and $R_{12}$–$C_{12}$ ($R_{11}$ is on the integrated circuit chip). The corner frequency of each R-C network is deliberately chosen well above the 30-Hz signal frequency to avoid introducing a large phase shift. With a 600-Hz corner frequency, the phase lag at 30 Hz is about 6°, and is relatively insensitive to small changes in R-C values while yet providing enough attenuation of the 9960-Hz subcarrier (about $50^{db}$). The six-degree phase lag can be conveniently compensated for by choosing appropriate values for $C_{13}$ and $R_{13}$, which couple the reference signal to the digital phase shifter.

Figure 5:
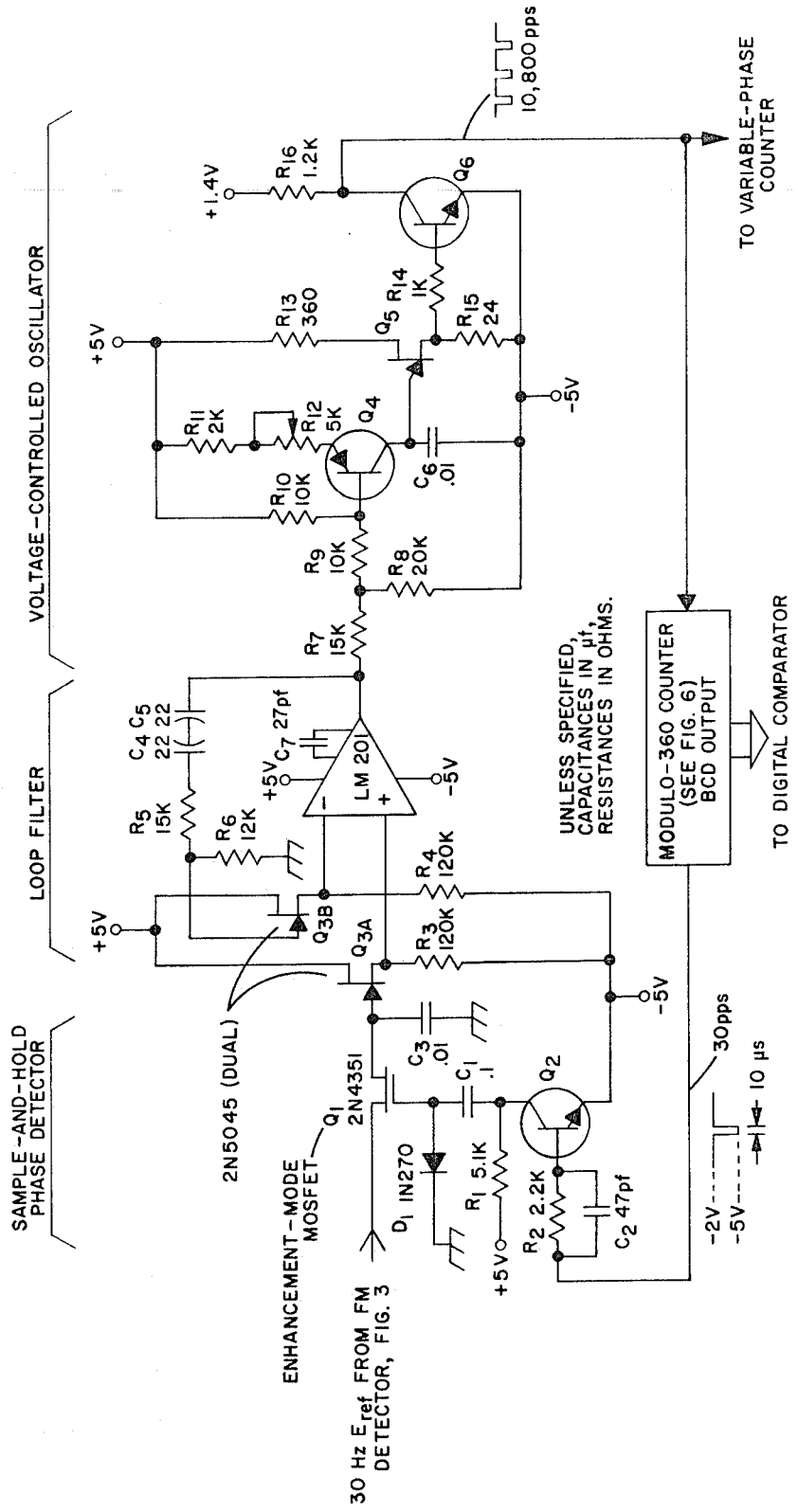
FIG. 5 is a detailed schematic of the phase lock loop.

The phaselock loop, FIG. 5, is used to keep the modulo 360 counter locked in phase with the 30-Hz reference. The loop is made up of a sample-and-hold phase-error detector, a loop filter, a voltage-controlled oscillator (VCO), and the counter, which produces an output pulse for each 360 input pulses. If this output pulse does not coincide with the zero-crossing of the input signal, a dc error is developed at the phase detector output, which shifts the VCO until the error is reduced to zero.

The loop is a two-integrator type so that the static phase error is zero, except for possible offset in the phase detector and loop filter. These errors are negligible with the circuit shown. The two loop integrators are: (a) the VCO, whose output phase is the integral of its frequency, and (b) the loop filter which is an operational integrator with lead compensation for loop stability.

The phase-error detector is an enhancement-mode MOSFET sampling gate, which is turned on by the pulse from the counter. The value of the sine wave input voltage when the pulse occurs is stored on holding capacitor $C_3$ until the next sampling pulse. Hence, the error voltage is proportional to the sine of the phase error.

This type of phase detector is particularly suitable for this application in that its output has no ripple to be filtered out when the error is zero. With a conventional quadrature-type phase detector, a large 30-Hz ripple component would be present in the output, and would need a long-time-constant filter to remove it to avoid undesirable frequency modulation of the VCO. The long time constant would adversely affect loop stability.

The loop filter is an integrator with lead compensation for loop stability. The operational amplifier is buffered by a dual JFET for high impedance input to prevent discharging the holding capacitor.

The voltage-controlled oscillator is a conventional unijunction oscillator with a voltage-controlled current source $Q_4$ replacing the usual charging resistor. Since the frequency of the unijunction oscillator is proportional to the rate of charge of capacitor $C_6$, the voltage at the base of $Q_4$ controls the frequency. The emitter resistor of $Q_4$, $R_{12}$, is made variable to set the free-running frequency. Resistors $R_7$ through $R_{10}$ provide a level shift and an attenuation of the operational amplifier output to keep the VCO within its oscillating range. The VCO could not otherwise accomodate the full filter output swing.

The positive pulses at base 1 of $Q_5$ drive $Q_6$ whose output is compatible with the digital logic circuits.

Figure 6:
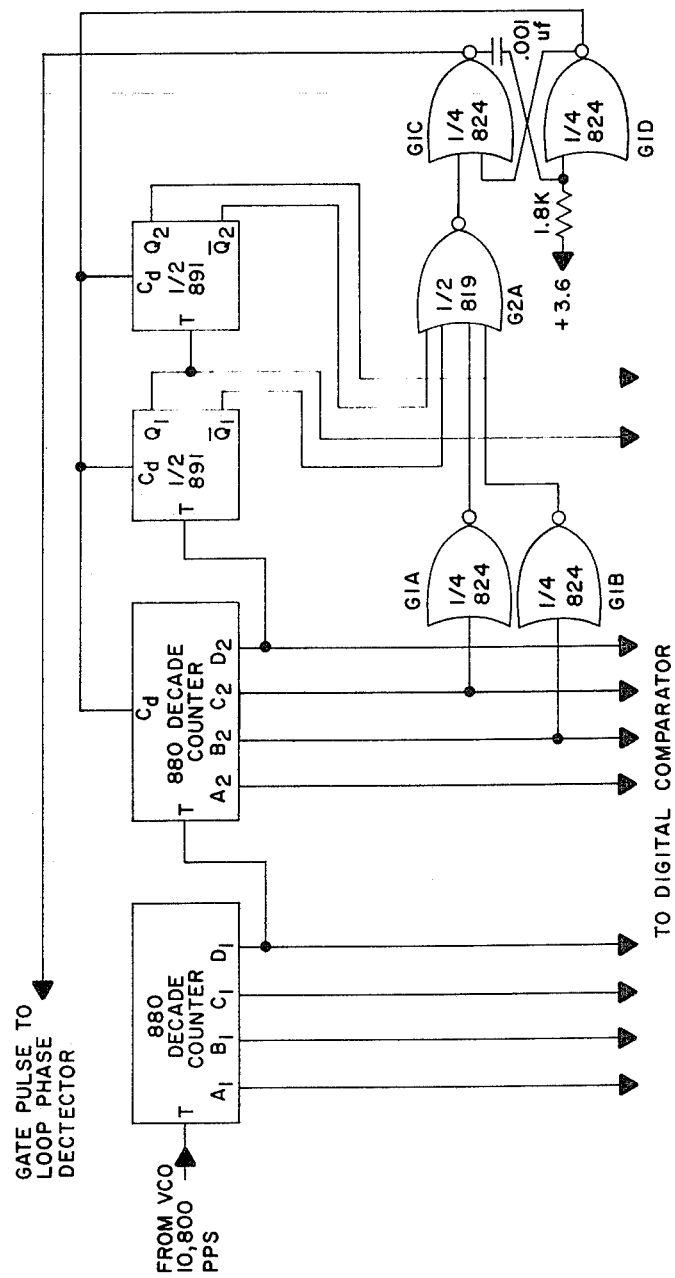
FIG. 6 is a diagram of the phase lock counter.

The modulo-360 counter, FIG. 6, is a straight binary-coded-decimal ripple counter. It is made to count modulo-360 by detecting the 360 state, and resetting to zero. The logic elements (for this circuit, as well as for all the digital circuits) are Motorola resistance-coupled logic (MRTL) elements of the MC800P family. Speed is not a consideration at the 10 kHZ clocking rates.

The counter consists of two decade counters and two flip-flops connected in cascade. The 360th state is the first state in the counting sequence for which $Q_1$, $Q_2$, $B_2$, and $C_2$ are all 1. Therefore, the reset can be made when the function $Q_1Q_2B_2C_2$ is detected. To form this function with a NOR gate requires the complements of these inputs, since, in NOR form, the function needed is $$\overline{f_R} = \overline{\overline{Q_1} + \overline{Q_2} + \overline{B_2} + \overline{C_2}}$$

The complements $\overline{Q_1}$ and $\overline{Q_2}$ are available from the flip-flops, and $\overline{B_2}$ and $\overline{C_2}$ are obtained from NOR gates G1B and G1A used as inverters. Gate G2A forms the function $f_R$ which triggers a one-shot made up of two NOR gates G1C and G1D. The one-shot, with a period of about 10 microseconds, assures reset of all stages of the counter and at the same time generates the gate pulse from the loop phase detector. (It is not necessary to reset the first decade, since it is already in the zero state at the count of 360.) The one-shot, made from the gates as shown, is similar to the conventional discrete-component model. In the stable state, the output of G1D is low, and that of G1C is high. G1C goes low when triggered by a high output from G2A and the transistion is coupled to G1D through a capacitor, forcing the G1D output high. This temporary state lasts until the 1.8K resistor charges the .001 μf capacitor to the switching threshold of G1D, at which time G1D returns to the low state, forcing G1C high again.

The binary-coded-decimal outputs from this counter are fed out to a digital comparator.

Figure 7:
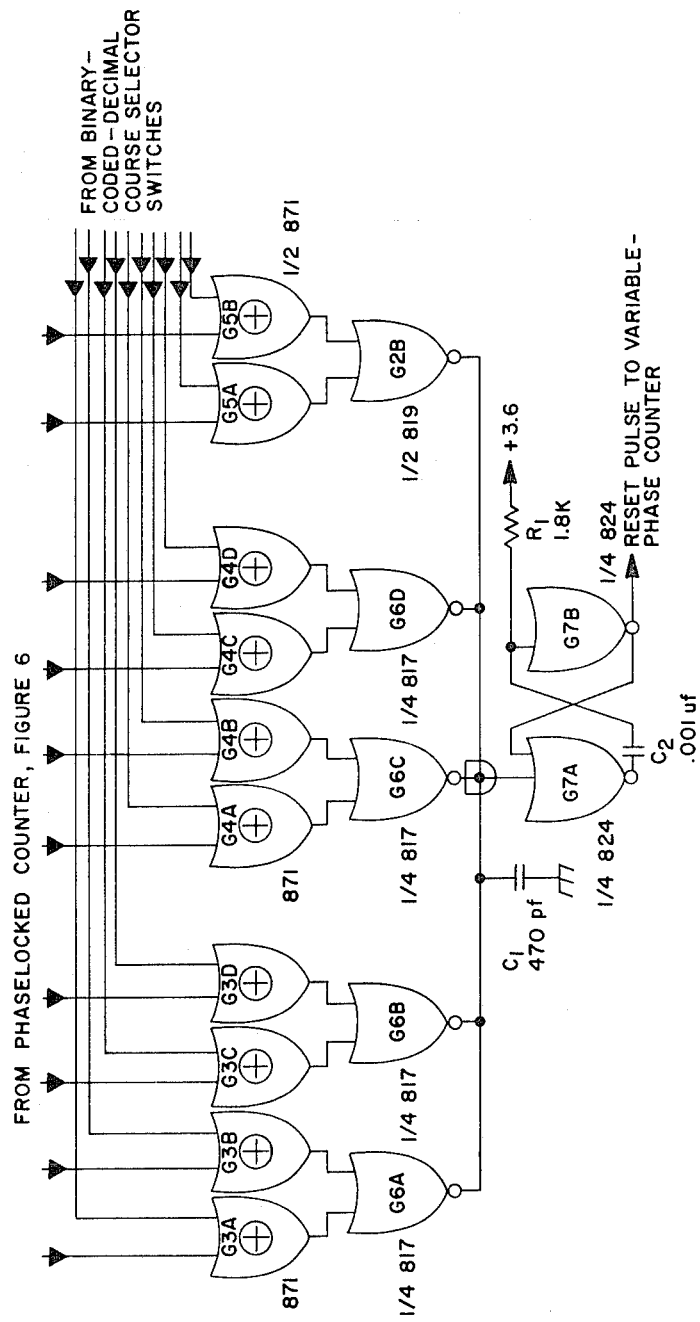
FIG. 7 is a logic diagram of the digital comparator.

The digital comparator of FIG. 7 has the function of continuously comparing the above counter's (FIG. 6) outputs with the binary-coded-decimal outputs of three ten-position thumbwheel switches, comprising the three-digit course selector, and providing an output pulse when coincidence occurs.

For two binary variables A and B, the "compare" function is $$f = AB + \overline{A}\overline{B}.$$

The function $f$ is 1 only if A and B are both 0 or both 1. The complement of the function, $\overline{f}$, is $$\overline{f} = A\overline{B} + \overline{A}B$$

which happens to be the EXCLUSIVE-OR function. One may then use an EXCLUSIVE-OR gate and invert its output to get the compare function. This is convenient, because quad EXCLUSIVE-OR gates are available in MRTL, and because the complement is naturally obtained when their outputs are combined in a NOR gate, as explained below.

When comparing multibit numbers, each bit of one must match the corresponding bit of the other. The compare function, $f$, for two multibit numbers is then $$f = f_1 f_2 f_3 \cdots,$$

where $f_1, f_2, f_3, \ldots$, are the individual compare functions for each corresponding pair of bits. To obtain this function with EXCLUSIVE-OR and NOR gates, the equation is rewritten in NOR form (noting that $AB = \overline{\overline{A} + \overline{B}}$) as $$f = \overline{\overline{f_1} + \overline{f_2} + \overline{f_3}} + \ldots$$

As already noted, $f_1$, $f_2$, $f_3$, ... are EXCLUSIVE-OR functions. These can be combined in a many-input NOR gate, according to the above equation, to obtain the desired compare function.

In the comparator of FIG. 7, gates G6A, B, C, D, and G2B form one ten-input NOR gate by paralleling their outputs and omitting the $V_{cc}$ connection to all but one of the gates. When the phaselocked counter state matches the switch-set state, the NOR gate output triggers a one-shot composed of G7A and G7B, which in turn generates a pulse to reset another counter, the variable-phase counter. The NOR gate output may not be used directly to reset the counter since the output is high for a full clock period and would cause the variable-phase counter to skip a clock pulse. The one-shot is a convenient way to shorten the reset pulse.

One problem with ripple counters is that transient states occur as the clock pulse ripples through. (Maximum propagation time through this counter is 260 nanoseconds.) Some of these transient states can coincide with the selector switch setting, and produce a false output. A small capacitor $C_1$, together with the load resistor in the logic package, forms a "glitch filter" to prevent these narrow spikes from triggering the one-shot. This, of course, introduces a small delay in the true comparison output, but the delay is insignificant. (It is equivalent to about .02° of phase at 30 Hz.)

Figure 8:
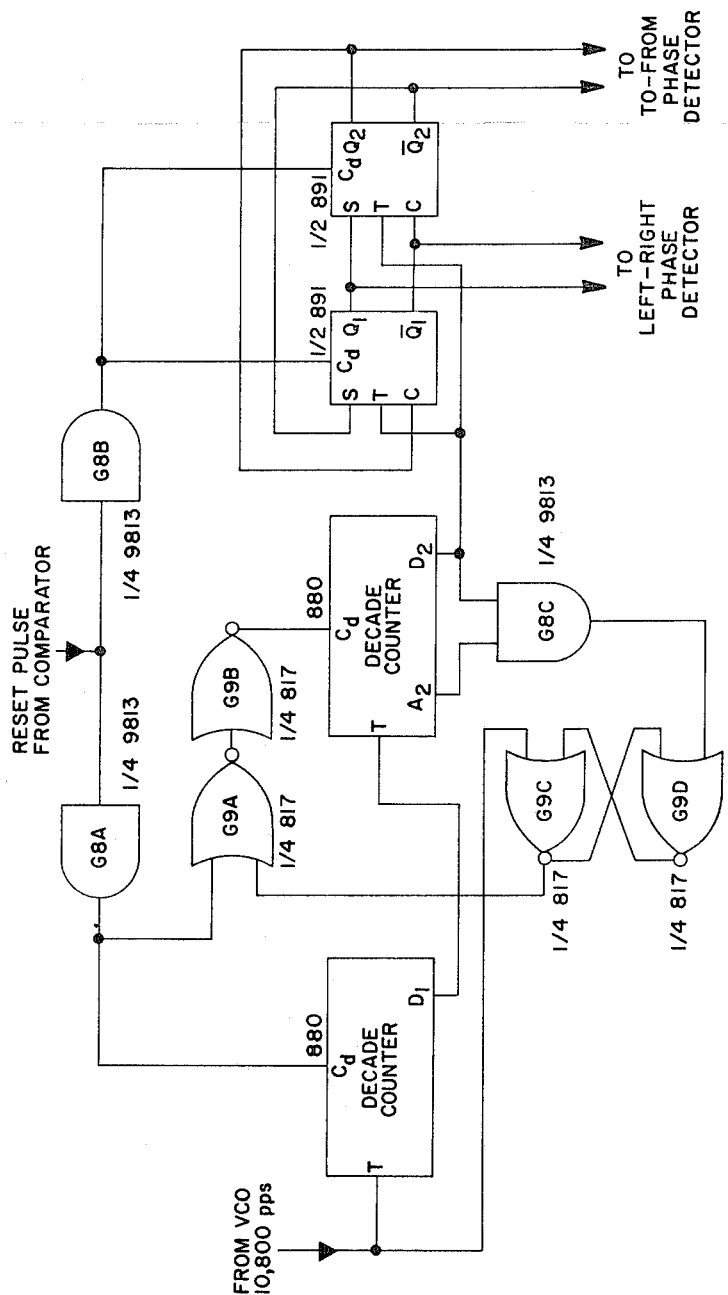
FIG. 8 is a logic diagram of the variable phase counter.

The comparator output pulse sets the variable-phase counter of FIG. 8 to zero, so that its counting sequence is delayed from the phase locked counter by the number of pulses set on the course selector. Since each pulse represents one degree of phase at 30 Hz, the desired phase shift is accomplished.

The variable-phase counter outputs are to be used as a reference for two phase detectors. Therefore, the counter logic is designed to produce two square-wave outputs in phase quadrature, and their complements.

As shown in FIG. 8, the variable-phase counter uses two decade counter packages and two J-K flip-flops. The first decade is unmodified, but the second is made to reset on reaching "9" so that it counts modulo 9 instead of 10. Thus, the two in tandem divide the input clock by 90, generating an output at 90-degree intervals, referred to 30 Hz. This output triggers a two-flip-flop shift counter, which counts in the sequence 00, 10, 11, 01, 00, etc. Notice that each flip flop is high for two triggering periods, and low for the next two, and that $Q_2$ is offset from $Q_1$ by one triggering period, or 90 degrees. Therefore, the outputs $Q_1$ and $Q_2$ are 30-Hz square waves, with $Q_2$ lagging $Q_1$ by 90 degrees. The complements $\overline{Q_1}$ and $\overline{Q_2}$ are also available. These square waves are ideal for driving the phase detectors for the left-right and to-from indicators.

The following is a more detailed explanation of the logical design of FIG. 8.

Gates G8A and B are buffers to increase the drive capability of the comparator output.

G9A and B form an OR gate at the direct-clear input of the second decade, so that either the comparator output or the "9" state detector can reset the decade.

An AND gate, G8C, is the "9" detector. The "9" state is binary 1001, and is the only state for which $A_2$ and $D_2$ are both 1. This state sets the latch G9C and D, which in turn resets the decade. The latch is reset on the next positive clock transition. It might seem that the latch is unnecessary, that the decoded "9" could reset the decade directly. However, such a connection would set up a race condition. If either the "A" or the "D" stage of the decade should reset faster than the other, the "9" state and the reset pulse would disappear, leaving the "A" or "D" stage still set. By using the latch, it guarantees that the reset signal will remain long enough to reset both the "A" and "D" stages.

Figure 9:
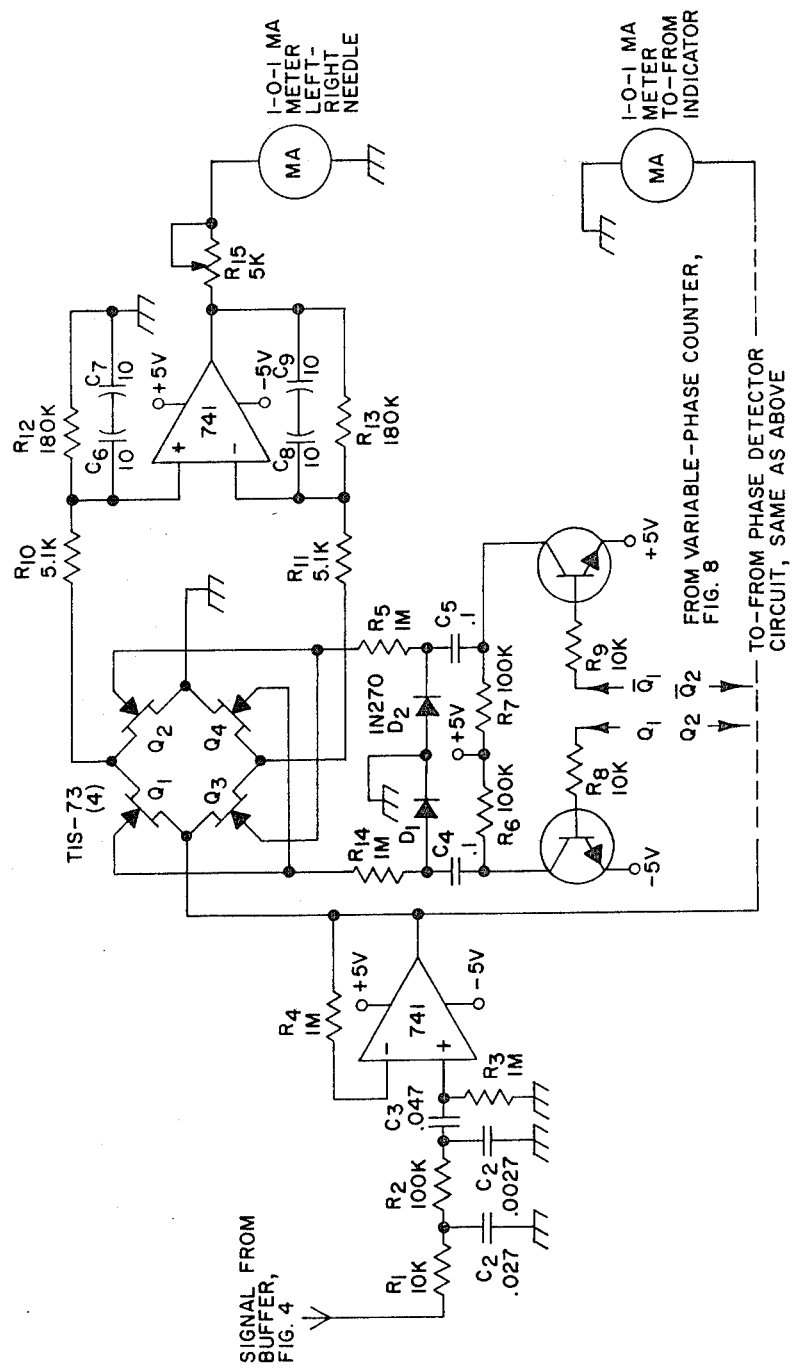
FIG. 9 is a detailed schematic of the course error indicating circuit.

The phase difference between the received bearing signal and the output of the variable-phase counter is a measure of course error. The phase comparison circuit, FIG. 9, provides a dc current proportional to this error to the indicating meters.

An output from the buffer (FIG. 4) is fed through a two-pole R-C low-pass filter to a voltage follower, which drives the phase detectors. The low-pass filter removes the 9960-Hz subcarrier. The corner frequency of each R-C section is again chosen high (600 Hz) with respect to the 30-Hz signal to keep phase lag low and insensitive to component variation. The coupling network $R_3$-$C_3$ provides a compensating phase lead. Precise phase compensation is not necessary as long as the overall phase shift here equals that introduced in the reference channel by the filter and coupling net after the subcarrier demodulator. If necessary, one of the components could be made variable to make these shifts equal.

The voltage follower output goes to an identical pair of full-wave phase detectors, each consisting of an operational amplifier switched between the inverting and non-inverting modes by a four-FET bridge. The square-wave outputs from the variable-phase counter drive $Q_5$ and $Q_6$, which switch the FETs. When $Q_1$ and $Q_4$ are turned on, and $Q_2$ and $Q_3$ are off, $R_{11}$ is grounded through $Q_4$, and the voltage follower output is connected to the non-inverting input of the operational amplifier through $R_{10}$. When $Q_2$ and $Q_3$ are turned on, and $Q_1$ and $Q_4$ are off, $R_{10}$ is grounded through $Q_2$, and the signal is fed through $Q_3$ to the inverting input.

The dc output voltage $V_e$ is $$V_e = 2/\pi\ GE\sin\phi,$$

where $\phi = \theta - 90°$, and is the deviation from quadrature.

The left-right meter is usually adjusted for full-scale deflection with a ten-degree error. With such an error, a one-volt-peak input signal, and with the circuit constants shown, the error voltage is about 4 volts. For a one-milliampere-full-scale meter movement, the series resistance (including meter) should then be about 4K. The maximum amplifier output is limited by its supply voltage to plus or minus 5 volts, thus preventing damaging meter overloads.

An identical phase detector drives the to-from indicator.

Because of the low-pass filtering due to $C_6$ through $C_9$, and $R_{12}$ and $R_{13}$ in the operational amplifier, the phase detector possesses a very narrow-band response. The one-pole low-pass R-C time constant is about one second, making the 3 db bandwidth centered at 30 Hz about 0.3 Hz. The same bandwidth is also centered about each odd harmonic of 30 Hz, but with diminishing sensitivity as the order of the harmonic increases. There is no response to even harmonics.

The narrow bandwidth should provide good noise rejection. Propeller modulation sometimes occurs around 60 Hz, but since this is an even harmonic, it causes no problem. There should be no need for a 60-Hz notch filter ahead of the phase detector, as is found in some designs.

I claim:

1. A VHF omnidirectional range converter comprising:

input means adapted to receive an input signal containing at least bearing information;

said input signal containing two sub-signal of the same frequency wherein one sub-signal constitutes a reference signal such that the phase of this sub-signal is the same everywhere in space and the phase of the other sub-signal depends on the converter's magnetic bearing from the source of the input signal at any given time;

digital counting means operatively connected to said input means for generating pulses having a period equal to a predetermined degree of phase of said reference sub-signal;

bearing selector means for generating a desired bearing output in digital format;

comparator means for comparing the digital states of said counter means and said bearing means and outputting an output pulse when the state of the counter means corresponds to the desired bearing;

another counter means operatively coupled to the output of said comparator means for outputting waveforms in phase quadrature with each other therefrom;

left-right indicator means operatively receiving said other sub-signal of the input signal and one waveform from said another counter means for indicating whether the converter is right or left of the signal source; and to-from indicating means operatively receiving said other sub-signal of the input signal and another waveform from said another counter means for indicating whether the converter is approaching or departing the signal source.

2. A VOR converter as set forth in claim 1 and further including;
   a clock operatively coupled between said one subsignal of the input signal and said digital counting means and outputting a clock pulse such that one clock period corresponds to 1° of phase of the reference signal.

3. A VOR converter as set forth in claim 2 wherein;
   said reference signal is 30 Hz and the clock frequency is 360 times the reference phase frequency.

4. A VOR converter as set forth in claim 2 wherein;
   said clock comprises a voltage controlled oscillator.

5. A VOR converter as set forth in claim 4 wherein;
   said voltage controlled oscillator and counter means form part of a phase lock loop containing further means for adjusting the voltage controlled oscillator to force the counter output pulses to coincide with the zero crossings of the 30 Hz reference.

6. A VOR converter as set forth in claim 1 wherein;
   the comparator output pulse coupled to said another counter resets said another counter to zero.

7. A VOR converter as set forth in claim 2 wherein;
   said another counter also receives an output from the clock.

8. A VOR converter as set forth in claim 1 wherein;
   said another counter outputs two square waves in phase quadrature and their complements.

9. A VOR converter as set forth in claim 1 and wherein said left-right indicator means and said to-from indicator means each include phase detector means;
   said phase detector means also receiving said waveforms from said another counter means and said other sub-signals of said input signal.

* * * * *